Feb. 21, 1956 E. G. SHOWER 2,735,919

PHOTOTRANSISTOR AND METHOD OF MANUFACTURE

Filed May 20, 1953

INVENTOR.
EDMUND G. SHOWER
BY John J. Rogan
ATTORNEY

United States Patent Office 2,735,919
Patented Feb. 21, 1956

2,735,919

PHOTOTRANSISTOR AND METHOD OF MANUFACTURE

Edmund G. Shower, Quakertown, Pa., assignor to National Union Electric Corporation, Hatboro, Pa., a corporation of Delaware Application May 20, 1953, Serial No. 356,281

11 Claims. (Cl. 201—63)

This invention relates to photosensitive devices and more especially to transistors which respond to light wave excitation either in the visible or invisible portions of the photographic spectrum.

A principal object of the invention is to provide an improved phototransistor and method of manufacture thereof.

A feature of the invention relates to a simplified method of manufacturing a phototransistor of the so-called end-on illumination type.

Another feature relates to a phototransistor wherein the photosensitive semi-conductor junction can be made of small cross section and free from shadows of attached circuit conductors.

Another feature relates to an improved phototransistor having a substantially flat photoresponsive face constituted in part of the face of a germanium block or wafer and the flat face of a transistor alloy of the N-type transistor impurity or the P-type transistor impurity.

A further feature relates to an end-on phototransistor having a flat germanium and an impurity type junction face, together with an integral protective coating of light transparent material for the junction.

A further feature relates to an improved phototransistor of the single-ended type.

A still further feature relates to the novel organization, arrangement, and relative location and interconnection of parts whereby the performance and structural characteristics of a phototransistor are improved.

Other features and advantages not particularly enumerated will be apparent after a consideration of the following detailed descriptions and the appended claims.

While various forms of phototransistors have been proposed heretofore, one of the difficulties which has been encountered is that of providing the relatively minute phototransistor junction with circuit connection wires without causing the said wires to cast a shadow on the junction when it is illuminated. This problem is particularly difficult where the phototransistor is of the so-called end-on type and especially to where the phototransistor junction is required to be of a flat or nearly flat surface. In certain fields of use it is highly desirable to have a phototransistor device of the single ended type, namely one wherein the conductors or lead-ins for the two elements of the phototransistor junction are brought out at the same end of the device, so as to leave the opposite end of the device entirely unobstructed for light excitation. Since the lead-in conductors are relatively large in cross section or are commensurate in cross section with the phototransistor junction itself, this problem becomes of considerable importance. The present invention enables a so-called single ended phototransistor to be made without encountering the above difficulties.

In the drawing, which shows by way of example, one preferred method of making a phototransistor and the transistor itself.

Figure 1:
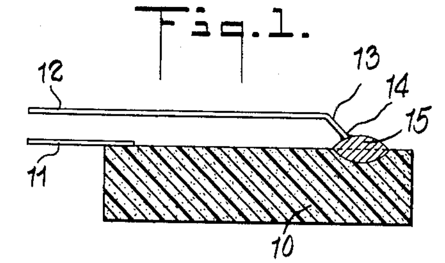
Fig. 1 is a sectional view illustrating certain of the initial method steps according to the invention.
Figure 2:
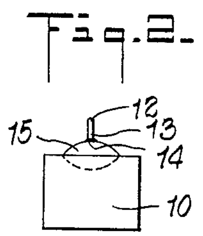
Fig. 2 is an end view of Fig. 1.

Referring more particularly to Figs. 1 and 2, the numeral 10 represents a block or disc of germanium, silicon or other semi-conductor material to which is attached, for example by soldering so as to form a conventional ohmic contact, a lead-in wire or circuit connection conductor 11 of any suitable material or alloy such as is customarily employed for lead-in conductors. Another lead-in wire 12 has its forward end bent substantially at right angles, as indicated at 13. Between the tip of the end 13 and the upper surface of member 10 there is provided a small piece of transistor impurity material 14. This material 14 may be either of the N-type impurity or the P-type impurity depending upon the impurity type of block 10, as is well-known in the transistor art. It is held in any suitable manner between the tip of wire 13 and the surface of member 10, and by means of a suitable electrical discharge applied to conductors 11, 12, or by external means, the material 14 is raised to its melting point so that it forms a localized alloy 15 with the germanium 10. At the same time the tip of conductor 13 becomes joined to the upper surface of the alloy 15 so that when the temperature cycle is discontinued a permanent bond is provided between the tip of wire 13 and the alloy 15, and this alloy, of course, is intimately bonded with the germanium 10. The size of the alloyed volume 15 can, of course, be controlled by the physical size of the impurity material which is located between the tip of wire 13 and the germanium block 10 at the time the melting operation is effected and by the time-temperature cycle referred to above.

Figure 3:
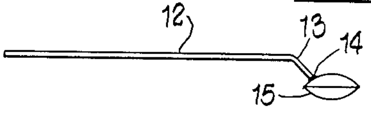
Fig. 3 is a view of a prefabricated lead-in wire and a transistor impurity-bearing material.

Preferably, the wire 13 may have the impurity material 14 previously attached thereto by solder 16 so that the elements 12 and 14 may be prefabricated as a separate unit as shown in Fig. 3, and so that the required mechanical pressure may be exerted between the impurity 14 and the surface of the germanium 10 during the melting operation above described. When the melting or alloying operation has been completed the device appears in end view as shown in Fig. 2, wherein all the parts are integrally mechanically bonded as a unit.

Figure 4:
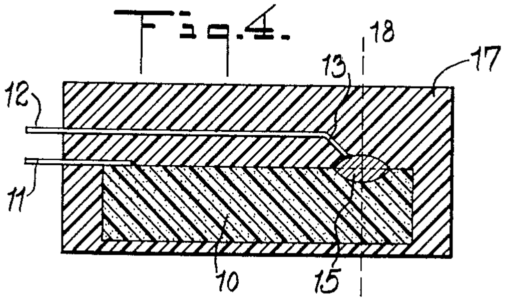
Figs. 4 and 5 are illustrations explanatory of succeeding steps according to the method of the invention.
Figure 5:
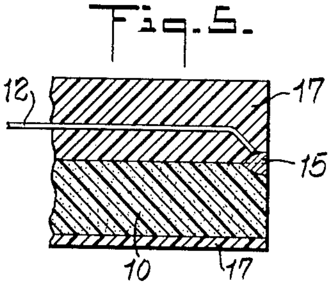
Figure 6:
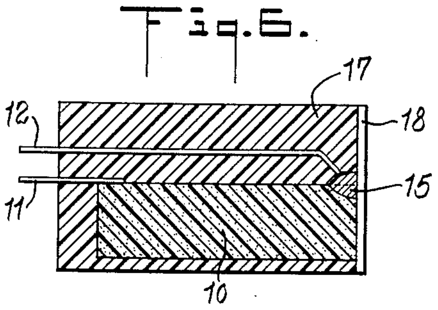
Fig. 6 shows in cross sectional view the finished phototransistor according to the invention.
Figure 7:
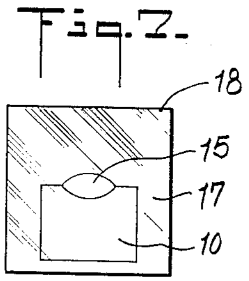
Fig. 7 is an end view of Fig. 4.

The device of Figs. 1 and 2 is then completely imbedded or potted in a mass 17 of suitable insulating material such as an insulating plastic, for example polystyrene, polyethylene, epoxy resin and the like. When the mass 7 is hardened, the entire assembly is sheared along the dotted line 18 (Fig. 4) so that the shearing plane is in advance of the bent tip 13 of conductor 12, as shown in Fig. 5. Thus, the front face of the device is completely flat and the exposed junction between the alloy 15 and the germanium 10 is photosensitive to impinging light rays. The germanium 10 constitutes the base electrode, the end of wire 13 constitutes the collector electrode, and the junction constitutes the emitter which is excited by the incident light. The flat front face of the device may be treated by etchants to remove material damaged in the cutting operation, as is well-known in the semi-conductor art.

Figure 8:
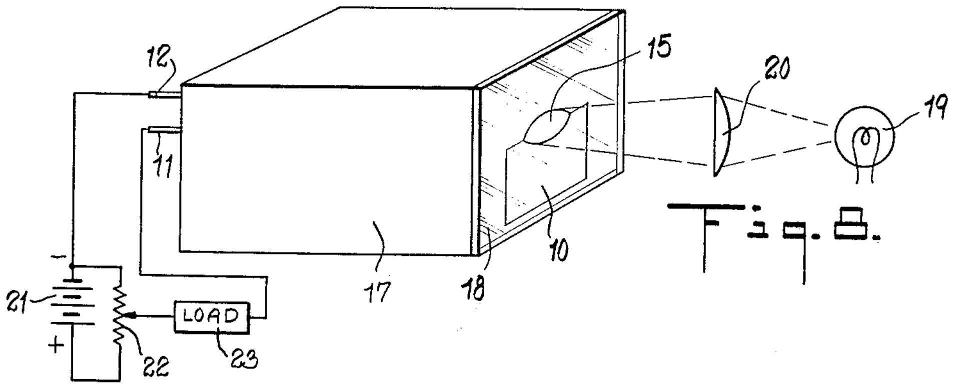
Fig. 8 is a perspective view of Figs. 4 and 5.

In order to protect the flat front face of the device, there is applied thereto a suitable transparent plastic film or sheet 18 which permits the phototransistor junction to respond to incident light while being protected from contamination. As shown in Fig. 8, the light from a variable light source 19 can be projected or focused by a suitable lens system 20 on to the transistor junction. The conductor 12 can then be connected to the negative or positive terminal of a suitable biasing source 21 depending upon whether the base material 10 is "N" or "P" type, across which is connected the coupling resistor 22, which in turn is adjustably connected to a suitable load 23, connected to the conductor 11.

Without limiting the explanation of the operation of the device, it is believed that the light which strikes the phototransistor junction 10—15 results in the production of free electron-hole pairs. Such pairs in the immediate vicinity of the collector tip 13 are subjected to the electric field of the collector and the charge is separated and collected before recombination of the holes and electrons can take place. The net result is a change in the collector current in conformity with the variations in intensity of the light source 19.

Figure 9:
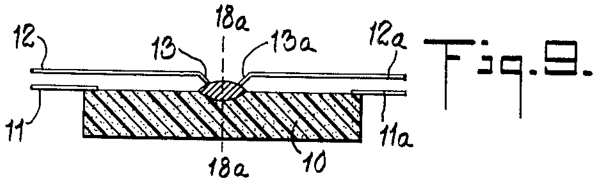
Fig. 9 is a modification of the process according to the invention.

It will be understood that various changes and modifications may be made in the disclosed embodiments without departing from the spirit and scope of the invention. For example, the plastic film or layer 18 may be made of any suitable colored material to act as a light filter in the event that it is desired to make the device selective to a particular color range. Furthermore, as shown in Fig. 9, the method may be practised by attaching two separate and oppositely extending ohmic conductors 11 and 11*a* to the opposite ends of the semi-conductor block or disc 10, and two separate and oppositely extending ohmic conductors 12, 12*a*, to the alloy 15. The assembly can then be imbedded in plastic or other thermosettable insulation and cut transversely along line 18, 18*a*, thus forming two identical phototransistors each of which can have its flat cut end provided with a film or sheet of transparent plastic similar to plastic 18.

What is claimed is:

1. The method of making a phototransistor which comprises, melting a piece of transistor impurity material to a localized region of a semi-conductor material to form a phototransistor alloy junction, attaching a lead-in wire to the alloy material at a point offset from the margin thereof, and then slicing through said junction at a point between the margin and the place of contact of said lead-in wire therewith, and thence through the semi-conductor to form a substantially flat exposure phototransistor surface which is free from light obstruction by said wire.

2. The method of making a phototransistor which comprises, bonding a transistor impurity bearing material with a semi-conductor material at a localized region thereof to form an alloy-bonded phototransistor junction, providing the junction with a pair of lead-in members, and then slicing through the junction to provide a substantially flat phototransistor exposure surface which is unobscured by said lead-in members.

3. The method of making a phototransistor which comprises, forming a phototransistor junction in the surface of a semi-conductor material, attaching a pair of lead-in wires to the elements of said junction with the lead-in wires extending in the same direction away from the junction, and then slicing through the junction transversely to said surface and at a point removed from the lead-in wires to form a substantially flat phototransistor exposure surface which is unobstructed by said lead-in wires.

4. The method of making a phototransistor which comprises, bonding to a semi-conductor material another material to form a localized phototransistor junction having a pair of lead-in wires extending away from said junction, then slicing through said junction transversely to the contacting surface between said two materials and at a region offset from the points of connection of said lead-in wires to form a substantially unobstructed phototransistor exposure surface, and bonding a layer of light transparent material to the said exposure surface.

5. The method of making a phototransistor which comprises, bonding to a semi-conductor material another material to form a localized phototransistor junction having a pair of lead-in wires extending away from said junction, embedding the said materials and said lead-in wires in insulating material to form a solid block with the lead-in wires extending from one end thereof, and then slicing through said block and through said materials to form a substantially flat-surfaced phototransistor junction exposure face which is unobstructed by said lead-in wires.

6. A phototransistor comprising a body of semi-conductor material having bonded thereto another material to form a localized and exposed phototransistor junction, and a pair of lead-in wires directly connected to the elements of said junction, said lead-in wires extending in substantially the same direction away from said junction to leave said junction completely exposed and substantially unobstructed by said wires.

7. A phototransistor comprising a body of semi-conductor material having bonded thereto another material to form the exposed phototransistor junction, a pair of lead-in wires directly connected to the elements of said junction and extending substantially in the same direction away therefrom, said junction having a substantially flat exposure face unobstructed by said lead-in wires.

8. A phototransistor comprising a body of semi-conductor material having bonded thereto another material to form an exposed phototransistor junction, a pair of lead-in wires directly connected to the elements of said junction and extending in substantially the same direction away from the exposure face of said junction, and a solid body of insulation material in which said materials, said junction and said lead-in wires are imbedded.

9. A phototransistor according to claim 8 in which said exposure face of the junction is substantially flat and is provided with a protective layer of light transparent material.

10. A phototransistor having a flat exposure face comprised of a cross-sectional slice through a body of semi-conductor material and a eutectic alloy bonded thereto and forming therewith an exposed phototransistor junction, lead-in wires connected respectively and directly to said semi-conductor material and to said alloy, said wires extending away from said junction in substantially the same direction away from said exposure face, and insulating means to hold said semi-conductor material said alloy material and said lead-in wires together as a rigid unit without obstructing said exposure face.

11. The method of making a phototransistor which comprises, bonding a transistor impurity bearing material with a semiconductor material to form a transistor junction extending along a dimension of said semiconductor material, attaching lead-in wires respectively to the two materials of the junction, and then slicing the junction through both sections of material in a direction transverse to said dimension to form an exposed phototransistor junction having a substantially flat face for illumination purposes and with the said lead-in wires extending away from said flat surface without any obscuring thereof.

References Cited in the file of this patent

UNITED STATES PATENTS

| | | |
|---|---|---|
| 2,402,662 | Ohl | June 25, 1946 |
| 2,569,347 | Shockley | Sept. 25, 1951 |
| 2,586,609 | Burke | Feb. 19, 1952 |
| 2,629,802 | Pantchechnikoff | Feb. 24, 1953 |